US012752810B2

(12) United States Patent
Jo

(10) Patent No.: US 12,752,810 B2
(45) Date of Patent: Oct. 6, 2026

(54) VEHICLE WARNING CONTROL METHOD AND DEVICE

(71) Applicant: HL Klemove Corp., Incheon (KR)

(72) Inventor: Eun San Jo, Incheon (KR)

(73) Assignee: HL Klemove Corp., Incheon (KR)

( * ) Notice: Subject to any disclaimer, the term of this patent is extended or adjusted under 35 U.S.C. 154(b) by 159 days.

(21) Appl. No.: 18/763,093

(22) Filed: Jul. 3, 2024

(65) Prior Publication Data

US 2025/0333072 A1 Oct. 30, 2025

(30) Foreign Application Priority Data

Apr. 30, 2024 (KR) ........................ 10-2024-0057480

(51) Int. Cl.
*B60W 50/14* (2020.01)
*B60W 30/09* (2012.01)
*B60W 30/095* (2012.01)

(52) U.S. Cl.
CPC ............ *B60W 50/14* (2013.01); *B60W 30/09* (2013.01); *B60W 30/0956* (2013.01); *B60W 2050/143* (2013.01); *B60W 2540/223* (2020.02); *B60W 2540/225* (2020.02)

(58) Field of Classification Search
CPC .. B60W 50/14; B60W 30/09; B60W 30/0956; B60W 2540/225; B60W 2540/223; B60W 2050/143
See application file for complete search history.

(56) References Cited

U.S. PATENT DOCUMENTS

| | | | | |
|---|---|---|---|---|
| 11,858,505 B2 * | 1/2024 | Sato | .................... | B60W 30/06 |
| 12,347,318 B2 * | 7/2025 | Kim | .................... | G08G 1/167 |
| 12,472,974 B2 * | 11/2025 | Lee | .................... | B60K 35/10 |
| 2015/0246673 A1 * | 9/2015 | Tseng | .................... | B60W 30/00 701/23 |
| 2018/0141570 A1 * | 5/2018 | Kimura | .................... | B60Q 3/731 |
| 2020/0001839 A1 * | 1/2020 | Lee | .................... | B60T 8/17558 |
| 2020/0391591 A1 * | 12/2020 | Kim | .................... | B60W 30/08 |

(Continued)

FOREIGN PATENT DOCUMENTS

| | | |
|---|---|---|
| KR | 10-2012-0056158 A | 6/2012 |
| KR | 10-1391608 B1 | 5/2014 |

(Continued)

OTHER PUBLICATIONS

Office Action issued in KR 10-2024-0057480; mailed by the Korean Ministry of Intellectual Property on Mar. 16, 2026.

*Primary Examiner* — Muhammad Adnan
(74) *Attorney, Agent, or Firm* — Studebaker Brackett PLLC

(57) ABSTRACT

The present embodiments relate to technology for controlling a warning time of a vehicle and may provide a vehicle warning control device and method comprising a receiver receiving sensing information through an in-vehicle sensor, a determiner determining a collision risk degree of the vehicle and a driver's intent based on the sensing information, a warning time corrector setting a warning control time by applying a correction value determined based on a result of determining the collision risk degree and the driver's intent, and a signal generator generating at least one of a warning signal and a vehicle movement control torque signal based on the warning control time.

20 Claims, 8 Drawing Sheets

(56) References Cited

U.S. PATENT DOCUMENTS

| | | | | |
|---|---|---|---|---|
| 2021/0101589 | A1* | 4/2021 | Jeon | G05D 1/0061 |
| 2022/0234654 | A1* | 7/2022 | Kakeshita | B62D 6/002 |
| 2023/0144727 | A1* | 5/2023 | Kim | G08G 1/167<br>340/435 |
| 2023/0365126 | A1* | 11/2023 | Lee | G01S 13/867 |
| 2025/0033631 | A1* | 1/2025 | Kim | B60W 60/0015 |

FOREIGN PATENT DOCUMENTS

| | | | |
|---|---|---|---|
| KR | 10-1987636 | B1 | 9/2019 |
| KR | 10-2020-0144175 | A | 12/2020 |
| KR | 10-2022-0170656 | A | 12/2022 |

* cited by examiner

VEHICLE WARNING CONTROL METHOD AND DEVICE

CROSS-REFERENCE TO RELATED APPLICATION

This application claims priority from Korean Patent Application No. 10-2024-0057480, filed on Apr. 30, 2024, which is hereby incorporated by reference for all purposes as if fully set forth herein.

BACKGROUND

Field

The present embodiments relate to technology for controlling a warning time of a vehicle.

Description of Related Art

Recently, in the automobile industry, as the development of information and communication technology and the importance of individual leisure increase, the development of driving intelligence assistance and autonomous driving technology is attracting attention.

Here, autonomous driving refers to the technology for controlling the vehicle by recognizing the surrounding environment without intervention of the driver and determining the driving context using external information such as map information and sensors configured in the vehicle such as light detection and ranging (LiDAR) or global positioning system (GPS). Through this, it is possible to alleviate the driver's driving burden and provide an advantage of securing a time for productivity or leisure in the vehicle.

Further, various in-vehicle driving intelligence assistance functions such as lane keeping assistance technology, vehicle follow control technology, and lane departure prevention technology, are being added and actively used.

However, the above-described functions of the vehicle are implemented based on a plurality of sensors configured in the vehicle and information received from the outside. Further, the function is operated based on a specific situation, and the function is operated according to whether a preset condition is met.

However, as various functions are operated according to predetermined conditions, consideration of unexpected situations that may occur on the road is insufficient.

For example, the lane keeping assistance technology, the lane departure prevention technology, or the like may generate a warning when a preset condition is met. However, the driver's behavior pattern (e.g., not turning on the turn signal) and the position of the surrounding vehicles in another lane may be variously changed. When it is not possible to dynamically respond to such a change in the situation, warning signaling and intervention of automatic control on the vehicle may cause inconvenience to the driver.

Accordingly, there is a need for a technology for controlling a warning generated in a vehicle considering changes in road conditions and various driver patterns.

BRIEF SUMMARY

Embodiments of the disclosure provide a method and device for controlling a warning time of a vehicle.

In an aspect, the present embodiments may provide a vehicle warning control device comprising a receiver receiving sensing information through an in-vehicle sensor, a determiner determining a collision risk degree of the vehicle and a driver's intent based on the sensing information, a warning time corrector setting a warning control time by applying a correction value determined based on a result of determining the collision risk degree and the driver's intent, and a signal generator generating at least one of a warning signal and a vehicle movement control torque signal based on the warning control time.

In another aspect, the present embodiments may provide a vehicle warning control method comprising receiving sensing information through an in-vehicle sensor, determining a collision risk degree of the vehicle and a driver's intent based on the sensing information, setting a warning control time by applying a correction value determined based on a result of determining the collision risk degree and the driver's intent, and generating at least one of a warning signal and a vehicle movement control torque signal based on the warning control time.

According to the present embodiments, a method and device for controlling a warning time of a vehicle may be provided.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
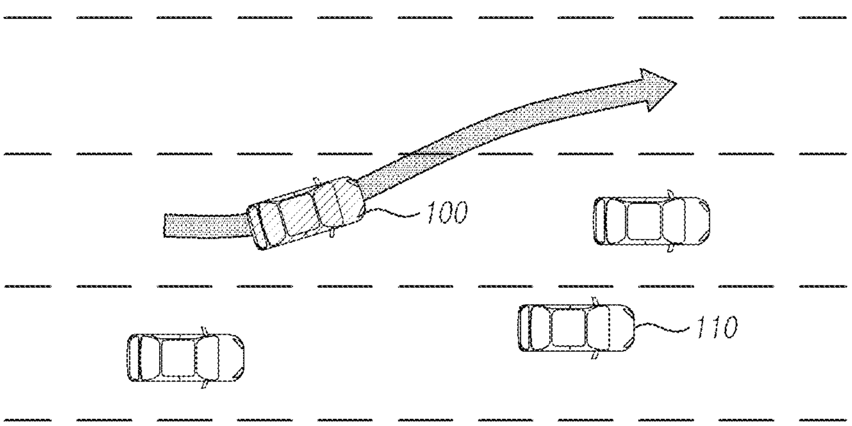
FIG. 1 is a view illustrating a vehicle warning control operation according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

In the disclosure, a technology for dynamically adjusting a warning control time at which a vehicle warning occurs is described. There are various warning generation logics in the vehicle. The present embodiments may be applied to a lane departure warning logic that generates a warning when the vehicle is likely to leave the lane. Alternatively, the present embodiments may be applied to a lane keeping assistance logic that controls the vehicle to drive while maintaining the lane and generates a warning when the vehicle leaves the center point of the lane. Further, the present embodiments may be applied to various warning generation logics configured in a vehicle.

In the disclosure, the above-described lane departure warning function and lane keeping assistance function are mainly described. However, this is for convenience of description and understanding, and the present embodiments may be applied to various functions of providing a warning to a vehicle. For example, even in the case of a function for preventing collision with a vehicle on a side lane, the warning control time may be dynamically set based on the collision risk degree and the driver’s intent.

In the disclosure, lane refers to one roadway (space) in which a vehicle drives, as composed of one lane line and another. Lane line refers to a line for distinguishing between lanes.

FIG. 1 is a view illustrating a vehicle warning control operation according to an embodiment.

Referring to FIG. 1, a vehicle 100 driving on a road in which a plurality of lanes are present may move to a side lane due to another vehicle ahead, an obstacle, or the like. In this case, in general, in order to change the lane, the driver should operate the in-vehicle turn signal to indicate the scheduled lane change.

However, as shown in FIG. 1, the turn signal may not operate in the vehicle 100 when the side lane is empty or due to the driver’s behavior pattern. In this case, when the vehicle 100 has a lane keeping assistance function or a lane departure warning function, a warning is generated when the vehicle 100 deviates from a predetermined point. This is the case when a warning is generated immediately when a fixed departure condition is met.

In this case, there is a problem in that an unnecessary warning is generated even though there is no other vehicle in the side lane and the driver’s intent to change the lane is apparent. This may cause the driver to feel uncomfortable as the driver’s behavior pattern is not considered.

Meanwhile, like the vehicle 110, the vehicle 110 may drive close to the lane according to the driver’s behavior pattern or the like. In this case, when the vehicle has a lane keeping assistance function or a lane departure warning function, a warning notification may be continuously generated in the vehicle 110.

In other words, even when the vehicle 100 is not willing to change the lane, the warning notification may be continuously displayed if a preset warning condition of the lane keeping assistance function is met. Likewise, this may distract the driver’s attention or cause discomfort because it does not match the driver’s behavior pattern.

However, when the warning notification is restricted using only the driver’s behavior pattern and the driver’s intent when there are various situations as described above, there may be a problem that the warning is not generated even in necessary situations.

Figure 2:
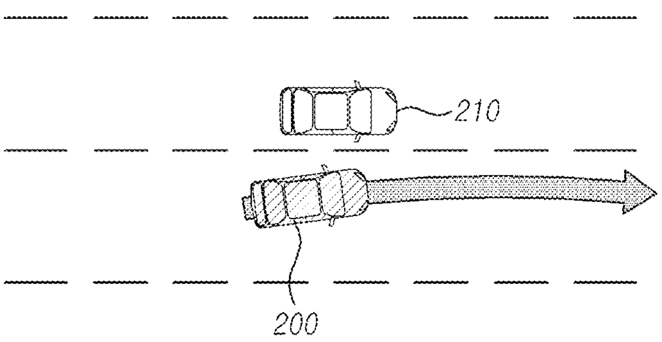
FIG. 2 is a view illustrating a situation in which a vehicle warning control operation according to an embodiment is applied in various environments.

FIG. 2 is a view illustrating a situation in which a vehicle warning control operation according to an embodiment is applied in various environments.

Referring to FIG. 2, the driver of a vehicle 200 may try to change the lane. In this case, similar to FIG. 1, the driver may not manipulate the turn signal. This may be a behavior pattern characteristic of the driver or a case in which another vehicle 210 is positioned in a blind spot and is not recognized.

In this case, when the warning notification is continuously made according to a fixed criterion as shown in FIG. 1, the notification is provided to the driver, but due to the experience of continuing the warning notification in the situation as shown in FIG. 1, the warning may fail to serve as a substantial warning to the driver.

Further, refraining from providing a warning notification when there is the driver’s intent in order to prevent continuous warning notification may limit the fundamental function of the warning notification by failing to prevent the risk of collision with the other vehicle 210.

This is because, when the other vehicle 210 is driving close to the lane, a more accurate and quick warning notification should be performed to prevent collision.

Thus, a need exists for technology for preventing unnecessary warning generation as much as possible as shown in FIG. 1 while enabling quicker generation of a notification when there is a substantial risk of collision as shown in FIG. 2.

Hereinafter, a technology for dynamically changing a warning control time in a vehicle is described. As described above, the disclosure may be applied to the warning function configured in the vehicle, and may be applied when there are various warning logics related to the lane. However, for convenience of understanding, functions for preventing lane departure and keeping the lane will be mainly described below.

Figure 3:
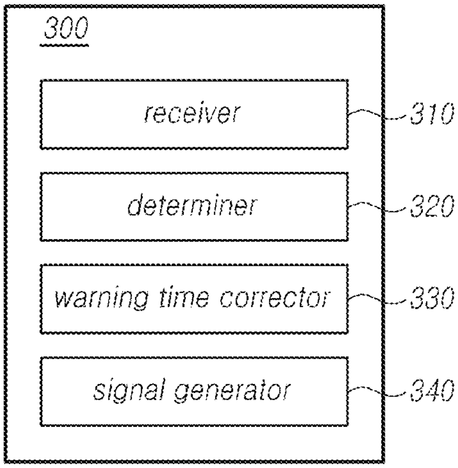
FIG. 3 is a view illustrating a configuration of a vehicle warning control device according to an embodiment.

FIG. 3 is a view illustrating a configuration of a vehicle warning control device according to an embodiment.

Referring to FIG. 3, a vehicle warning control device 300 may include a receiver 310 that receives sensing information through an in-vehicle sensor.

For example, the receiver 310 may receive sensing information from various sensors configured inside and outside the vehicle. The sensing information may be received through wired or wireless communication technology. Further, the receiver 310 may receive sensing information through a device such as a server outside the vehicle. For example, information about the driving road information about the vehicle may be received as sensing information through a navigation device.

For example, the sensing information may include at least one of lane information, surrounding vehicle recognition information, steering wheel grip information, and steering torque information. If the lane information refers to information about the lane of the road on which the vehicle is driving, the lane information may be obtained through the camera or the navigation device. The surrounding vehicle recognition information may include information about a surrounding vehicle recognized based on surrounding environment information recognized through a radar, a LiDAR, a camera sensor, or the like of the vehicle. For example, the surrounding vehicle recognition information may include whether there is a surrounding vehicle, the speed of the surrounding vehicle, location information, type information about the surrounding vehicle, and the like. Here, the surrounding vehicle may include an object such as an obstacle.

The steering wheel grip information may include information about whether the driver is holding the steering wheel. The steering wheel grip information may be obtained through a sensor configured on the steering wheel. Alternatively, the steering wheel grip information may be obtained by a camera sensor configured inside the vehicle and having the inside of the vehicle as a sensing range. The steering torque information may be obtained by a steering torque sensor connected to the steering wheel. The steering torque information includes information about the torque generated when the driver manipulates the steering wheel. The steering torque information may include information about the steering angle. In this case, the steering torque information may be obtained by a torque angle sensor.

Further, the sensing information may further include driver gaze information. The driver gaze information may include information for tracking or identifying the gaze as to where the driver is looking in the vehicle. The driver gaze information may be obtained by a camera sensor configured in the vehicle to track the driver's gaze.

The vehicle warning control device 300 may include a determiner 320 for determining a collision risk degree of the vehicle and the driver's intent based on the sensing information.

For example, the determiner 320 calculates a collision risk degree by determining whether there is a risk that the vehicle collides with another vehicle. Further, the determiner 320 determines the driver's intent by predicting whether the driver intends to change the lane.

For example, when it is determined that the driver grips the steering wheel based on the steering wheel grip information, the determiner 320 may determine the driver's intent according to whether steering torque information within a predetermined range in the moving direction of the vehicle is generated.

For example, the determiner 320 may determine whether the driver grips the steering wheel based on the steering wheel grip information. When it is determined that the driver grips the steering wheel, the determiner 320 may determine whether the steering torque is generated in the moving direction of the vehicle using the steering torque information. When the driver grips the steering wheel and the steering torque is generated within the predetermined range in the vehicle moving direction, the determiner 320 may determine that the driver is willing to deviate from the lane in the moving direction.

When the steering torque is out of the predetermined range, the determiner 320 may determine that the steering torque is generated by a temporary impact or a mistake, and determine that the driver does not intend to do so. Additionally, if the steering torque outside the predetermined range lasts for a predetermined time or more, the determiner 320 may determine that there is the driver's intent. This is because the steering torque temporarily falling out of the range may be due to an external force or a mistake, but the continuous steering torque may require a lane change in an urgent situation.

As another example, when it is determined that the driver grips the steering wheel based on the steering wheel grip information, the determiner 320 may determine the driver's intent based on whether steering torque information within the predetermined range is generated in the moving direction of the vehicle and whether the gaze information about the driver moves to a designated position set in association with the moving direction of the vehicle.

For example, the determiner 320 may determine that the driver has the intent to depart from the lane when the driver grips the steering wheel, steering torque information within the predetermined range is generated in the moving direction of the vehicle, and the gaze information about the driver moves to the designated position. In other words, the determiner 320 may determine that the driver has the intent when all of the three conditions are met. Alternatively, the determiner 320 may determine that the driver has the intent when two or more of the three conditions are met.

Here, the designated position may be set as a point where a side mirror of the vehicle is positioned. Since the side mirror position may be relative in the driver's gaze, the designated position may be dynamically set according to the height and position of the driver's gaze. Further, the gaze tracking information may be used to determine whether the gaze information about the driver has moved to the designated position. Further, it may be determined that the gaze has been moved to the designated position only when the driver moves the gaze to the designated position for a predetermined time or more.

In other words, when the driver grips the steering wheel and controls the movement of the vehicle by generating steering torque within the predetermined range, if the driver moves his gaze to the side mirror position positioned in the moving direction of the vehicle, it may be considered that the driver has the intent to move the vehicle in the corresponding direction and depart from the lane.

Accordingly, the determiner 320 determines whether the above-described conditions are met to determine whether the driver has the intent. Meanwhile, the determiner 320 may calculate a collision risk degree as well as whether the driver has the intent to do so.

For example, the determiner 320 may determine the collision risk degree based on a preset logic for calculating the collision risk degree between the vehicle and the target vehicle based on the surrounding vehicle recognition information.

In order to efficiently use computing power, the determiner 320 may select the target vehicle from among surrounding vehicles present in the moving direction of the vehicle. For example, the vehicle having the closest relative distance to the vehicle may be selected as the target vehicle. The determiner 320 may calculate the collision risk degree according to whether there is a collision risk degree using the information about the vehicle and the target vehicle.

For example, the determiner 320 may calculate a time to collision (TTC) between the vehicle and the target vehicle and determine that there is a risk of collision when the TTC is less than a threshold. Alternatively, the determiner 320 may determine the collision risk degree by calculating a time gap between the vehicle and the target vehicle. Alternatively, the determiner 320 may determine the collision risk degree of the vehicle using a responsibility-sensitive safety (RSS) model.

As the preset collision risk degree determination logic, various known logics for collision risk degree determination may be used, and the determination logic is not limited thereto.

The determiner 320 may arithmetically calculate the collision risk degree or may calculate the collision risk degree as a grade. This is determined according to a preset collision risk degree calculation method, and there is no limitation thereto.

Through the above-described operation, the determiner 320 may determine the driver's intent and the risk of collision. The driver's intent in the disclosure may include the driver's intent to depart from the lane or to control vehicle movement.

The vehicle warning control device 300 may include a warning time corrector 330 for setting a warning control time by applying a correction value determined based on the result of determining the driver's intent and the collision risk degree.

For example, the warning time corrector 330 may correct a reference warning time set in the vehicle using the driver's intent and the result of determining the risk of collision. To that end, the warning time corrector 330 may determine the correction value and apply the correction value to the reference warning time to set a warning control time, which is the time at which a warning is actually generated. Therefore, the warning control time is dynamically changed according to the determination result.

For example, when it is determined that the collision risk degree is less than a predetermined first threshold and the driver has the intent to depart from the driving lane according to the result of determining the driver's intent, the warning time corrector 330 may determine the correction value so that the warning control time is delayed more than the reference warning time. For example, if the risk of collision is evaluated to be low and the driver has the intent to do so, the warning time corrector 330 may delay the warning control time to provide a time for the driver to operate the turn signal. Here, the first threshold may be preset, and the threshold may be set in the same unit according to the calculation unit (e.g., level, grade, score, etc.) of the collision risk degree.

As another example, when the collision risk degree is equal to or larger than a preset second threshold, the warning time corrector 330 may determine the correction value so that the warning control time is earlier than the reference warning time. For example, when it is determined that the collision risk degree is high, the warning time corrector 330 may advance the warning time so that the warning is generated quickly regardless of the driver's intent. To that end, the second threshold may also be set to be the same in unit as the first threshold. Meanwhile, the first threshold and the second threshold may be set to different values, and the second threshold may be set to a value larger than the first threshold (indicating that the risk is high).

As another example, when it is determined that the collision risk degree is larger than or equal to the first threshold and less than the second threshold or the collision risk degree is less than the first threshold but the driver does not intend to depart from the driving lane, the warning time corrector 330 may determine that the correction value is 0 and determine that the warning control time is the reference warning time. For example, the warning time corrector 330 may allow the warning to operate at the reference warning time without correcting the warning control time.

The above-described correction value may be set as a value for delaying or advancing the reference warning time, and the factor may be determined according to the factor for setting the reference warning time. For example, when the reference warning time is set based on the distance between the lane and the vehicle, the correction value may also be set to a value capable of changing the distance. For example, the correction value may be set as a percentage value, and the warning control time may be changed by proportionally changing the distance. As another example, the correction value may be set as a distance value and be added to the distance for the reference warning time, thereby changing the warning control time. Further, the correction value may be set in various ways, and may act as a factor on various logics to be used to dynamically set the warning control time.

For example, the warning control time may be set by applying the correction value with respect to half of the distance except for the vehicle width from the width of the driving lane in which the vehicle drives. In other words, the reference warning time may be determined so that a warning is generated when the vehicle approaches the lane by 50% or more of the half distance of a half of the distance obtained by subtracting the vehicle width from the road width. In this case, the correction value may be set to a value for changing the corresponding 50% to 90% or to 20%. Alternatively, the correction value may be set as a value for changing the distance itself. There is no limitation on the unit and application method of the correction value.

The vehicle warning control device 300 may include a signal generator 340 that generates at least one of a warning signal and a vehicle movement control torque signal based on the warning control time.

For example, the signal generator 340 may generate a warning signal so that a warning is generated by at least one of visual, auditory, and tactile senses. Alternatively, the signal generator 340 may generate a warning signal so that warnings for visual, auditory, and tactile senses are changed sequentially or adaptively in response to a response. For example, the signal generator 340 may control to primarily generate an auditory signal and, if the warning situation continues even after a predetermined time, may additionally generate a tactile signal or a visual signal.

Meanwhile, the signal generator 340 may generate a movement control torque signal to prevent the vehicle from departing from the lane. To that end, the assist torque may be calculated. When the lane keeping assistance function is turned on, the signal generator 340 may change the movement of the vehicle by calculating the assist torque to keep the vehicle in the lane.

Through the above-described operations, the vehicle warning control device may dynamically control a warning signal generated in the vehicle, thereby reducing unnecessary warnings and enhancing driver safety.

Hereinafter, the operations of the above-described vehicle warning control device are described in more detail with reference to the accompanying drawings. Each of the embodiments described below may be practiced independently or in any combination by the vehicle warning control device and method.

Figure 4:
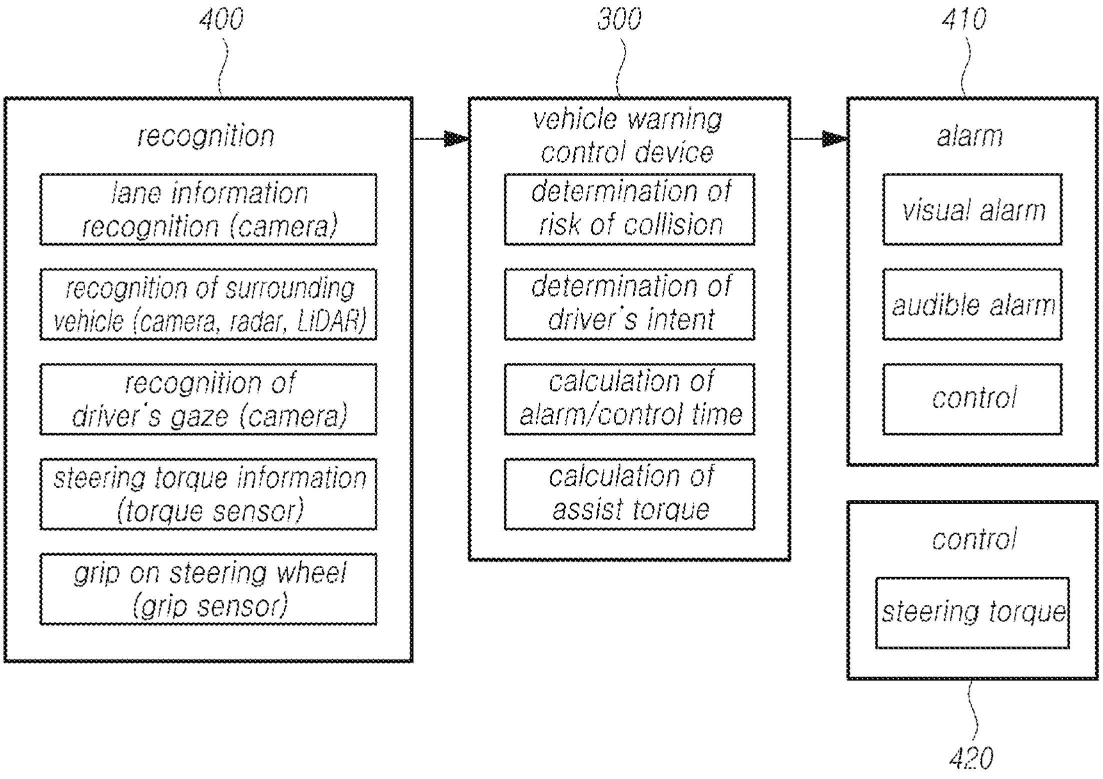
FIG. 4 is a view illustrating a vehicle system including a vehicle warning control device, according to an embodiment.

FIG. 4 is a view illustrating a vehicle system including a vehicle warning control device, according to an embodiment.

Referring to FIG. 4, the vehicle warning control device 300 may receive sensing information from a recognition configuration 400. For example, the vehicle warning control device 300 may receive sensing information to determine a collision risk degree and determine the driver's intent. Further, the vehicle warning control device 300 may calculate an alarm/control time using the determination result. Further, when necessary, the vehicle warning control device 300 may calculate the assist torque to provide a steering torque for preventing the vehicle from departing from the lane.

To that end, the recognition configuration 400 configured inside and outside the vehicle may generate various sensing information.

For example, the camera sensor may recognize lane information using the captured image of the front/rear/side of the vehicle and provide the lane information to the vehicle warning control device 300. The camera, the radar, the LiDAR sensor, and the like of the vehicle may detect an object around the vehicle and recognize the surrounding vehicle using the object. The recognized surrounding vehicle information may also be provided to the vehicle warning control device 300.

The camera sensor mounted inside the vehicle to capture the driver may track the driver's gaze to recognize the direction of the driver's gaze. The recognized driver gaze information may be provided to the vehicle warning control device 300. The torque sensor configured on, e.g., the column of the vehicle may sense steering torque information and provide the sensed steering torque information to the vehicle warning control device 300. Likewise, a grip sensor mounted on the steering wheel may detect whether the steering wheel is gripped by the driver and provide it to the vehicle warning control device 300. The grip sensor may be mounted on the steering wheel or may be configured as a camera sensor inside the vehicle.

The vehicle warning control device 300 determines the driver's intent to depart from the lane using the provided sensing information, and calculates a collision risk degree with a surrounding vehicle. An alarm (warning) control time may be calculated based on the calculated collision risk degree and the driver's intent. When the vehicle has a lane keeping function, the lane keeping function may provide an assist torque along with a warning to help the vehicle drive in the lane.

To that end, the vehicle warning control device 300 may calculate the required assist torque considering the moving direction, speed, and movement position of the vehicle. Various known logics may be used to calculate the assist torque. Further, the vehicle warning control device 300 may determine a control time for providing the assist torque to be the same as the warning control time. In other words, the warning control time and the control time for vehicle movement control may be considered to be the same.

When the warning control time is determined, the vehicle warning control device 300 may generate and transmit a control signal to the configuration 410 for an alarm. For example, various types of alarms such as a visual alarm, an auditory alarm, and a tactile alarm may be applied to the configuration of the alarm 410. Further, various alarm configurations for notifying the driver of a specific situation may be included. As described above, the alarm may be changed and provided based on each situation or the duration of the situation.

Further, when the vehicle movement needs to be directly controlled, the vehicle warning control device 300 may generate a control signal based on the calculated assist torque and movement control time and transmit the control signal to the control configuration 420.

The control configuration 420 may generate a steering torque using a steering assistance motor or the like according to the received assist torque. Accordingly, the vehicle may be prevented from departing from the lane while keeping in the lane.

As such, the vehicle warning control device 300 may be configured in conjunction with the recognition configuration 400, the alarm configuration 410, and the control configuration 420 in the vehicle. For communication between the configurations, internal communication or a wired/wireless communication scheme may be used.

Figure 5:
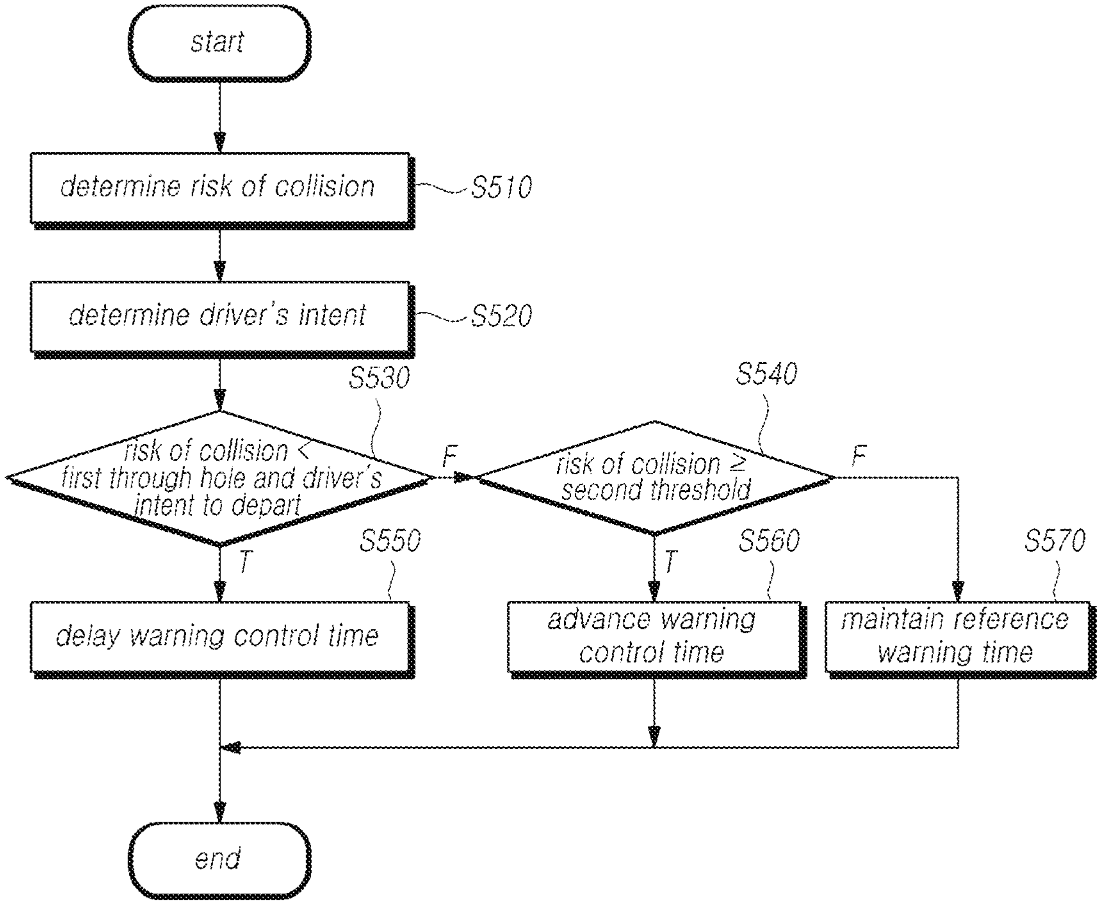
FIG. 5 is a view illustrating an operation of determining a warning control time of a vehicle warning control device, according to an embodiment.

FIG. 5 is a view illustrating an operation of determining a warning control time of a vehicle warning control device, according to an embodiment.

Referring to FIG. 5, the vehicle warning control device may determine a collision risk of the vehicle using the received sensing information (S510). For example, when the vehicle moves in a specific direction, a target vehicle may be selected by the surrounding vehicle recognition information. The target vehicle may be selected as a surrounding vehicle that is close in the relative distance to the vehicle in the moving direction of the vehicle.

When the target vehicle is selected, the vehicle warning control device may determine the possibility of collision with the vehicle using at least one of the relative speed, speed, relative distance, vehicle type, size, and position information about the target vehicle.

For example, the vehicle warning control device may calculate a time to collision (TTC) between the vehicle and the target vehicle and determine that there is a risk of collision when the TTC is less than a threshold. The vehicle warning control device may calculate the possibility of collision between the vehicle and the target vehicle using speed, acceleration information, position information, and direction information about the vehicle and the target vehicle. When the possibility of collision is calculated, the time TTC taken for the vehicle and the target vehicle to collide may be measured. When the TTC is calculated, the vehicle warning control device may calculate a collision risk according to the TTC. For example, the risk of collision may be calculated according to a preset level or grade for each TTC. Alternatively, the vehicle warning control device may linearly or exponentially calculate the collision risk as an analog value according to the TTC.

As another example, the vehicle warning control device may determine a collision risk degree by calculating a time gap between the vehicle and the target vehicle. The time gap is a value obtained by dividing the distance by the speed and may be calculated as a time required for the target vehicle to move in connection with another vehicle. Alternatively, the time gap may be calculated based on a time difference until the vehicle and the target vehicle meet each other. The vehicle warning control device may calculate the collision risk as a level, a grade, or an analog value based on the time gap.

As another example, the vehicle warning control device may determine a collision risk degree of the vehicle using a responsibility-sensitive safety (RSS) model. For example, the vehicle warning control device may calculate the risk of collision between the vehicle and the target vehicle using the RSS model. As the RSS model, various known models may be used. Alternatively, the RSS model may be a tuning model resultant from tuning various known models.

As the preset collision risk degree determination logic, various known logics for collision risk degree determination may be used, and the determination logic is not limited thereto.

Through the operations, the vehicle warning control device may calculate a risk of the vehicle colliding with the target vehicle. As described above, the collision risk degree may be calculated as a level or grade. Alternatively, the collision risk degree may be calculated as an analog value.

Meanwhile, the vehicle warning control device may determine the driver's intent to depart from the lane (S520). The driver intent determination may be determined by sensing information.

For example, when it is determined that the driver grips the steering wheel based on the steering wheel grip information, the vehicle warning control device may determine the driver's intent according to whether steering torque information within a predetermined range in the moving direction of the vehicle is generated.

For example, the vehicle warning control device may determine whether the driver grips the steering wheel based on the steering wheel grip information. When it is determined that the driver grips the steering wheel, the vehicle warning control device may determine whether the steering torque is generated in the moving direction of the vehicle using the steering torque information. When the driver grips the steering wheel and the steering torque is generated within the predetermined range in the vehicle moving direction, the vehicle warning control device may determine that the driver is willing to deviate from the lane in the moving direction.

When the steering torque is out of the predetermined range, the vehicle warning control device may determine that the steering torque is generated by a temporary impact or a mistake, and determine that the driver does not intend to do so. Additionally, if the steering torque outside the predetermined range lasts for a predetermined time or more, the vehicle warning control device may determine that there is the driver's intent. This is because the steering torque temporarily falling out of the range may be due to an external force or a mistake, but the continuous steering torque may require a lane change in an urgent situation.

As another example, when it is determined that the driver grips the steering wheel based on the steering wheel grip information, the vehicle warning control device may determine the driver's intent based on whether steering torque information within the predetermined range is generated in the moving direction of the vehicle and whether the gaze information about the driver moves to a designated position set in association with the moving direction of the vehicle.

For example, the vehicle warning control device may determine that the driver has the intent to depart from the lane when the driver grips the steering wheel, steering torque information within the predetermined range is generated in the moving direction of the vehicle, and the gaze information about the driver moves to the designated position. In other words, the vehicle warning control device may determine that the driver has the intent when all of the three conditions are met. Alternatively, the vehicle warning control device may determine that the driver has the intent when two or more of the three conditions are met.

Here, the designated position may be set as a point where a side mirror of the vehicle is positioned. Since the side mirror position may be relative in the driver's gaze, the designated position may be dynamically set according to the height and position of the driver's gaze. Further, the gaze tracking information may be used to determine whether the gaze information about the driver has moved to the designated position. Further, it may be determined that the gaze has been moved to the designated position only when the driver moves the gaze to the designated position for a predetermined time or more.

In other words, when the driver grips the steering wheel and controls the movement of the vehicle by generating steering torque within the predetermined range, if the driver moves his gaze to the side mirror position positioned in the moving direction of the vehicle, it may be considered that the driver has the intent to move the vehicle in the corresponding direction and depart from the lane.

Steps S510 and S520 described above may be performed simultaneously. Alternatively, step S520 may be performed before step S510. In other words, steps S510 and S520 may be performed in parallel or in time series regardless of the order thereof.

When the collision risk degree determination and the driver intent determination are completed, the vehicle warning control device may determine whether a condition for changing the warning control time is met based on the determination result.

For example, as a result of determining the collision risk degree, it is determined whether the collision risk degree is lower than the predetermined first threshold and whether the driver has the intent to depart from the lane (S530). When it is determined in step S530 that the driver has the intent to depart from the lane and the collision risk degree is lower than the first threshold (True), the vehicle warning control device delays the warning control time (S550). In other words, when the collision risk degree is low and the driver has the intent to depart from the lane, the vehicle warning control device determines and applies a correction value so that the time when the warning is generated is delayed in order to reduce the possibility of generation of an unnecessary warning.

If it does not correspond to step S530, the vehicle warning control device determines whether the collision risk degree is larger than or equal to a second threshold (S540). When the collision risk degree is larger than or equal to the second threshold, the vehicle warning control device determines and applies a correction value to advance the warning control time (S560). In other words, when the collision risk degree is higher than the second threshold, the vehicle warning control device may determine that a risky situation and advance the warning control time earlier than the reference warning time regardless of the driver's intent to decrease the possibility of risk.

When the collision risk degree is less than the second threshold in step S540, the vehicle warning control device controls the preset reference warning time to be maintained by refraining from applying the correction value or by setting a non-corrected value as the correction value (S570).

Here, the first threshold is set as a value having a lower collision risk degree than the second threshold. Further, the threshold may be preset so that there is a section where the reference warning time is applied between the first threshold and the second threshold. In other words, the first threshold and the second threshold are not continuous values. Further, the first threshold and the second threshold may be determined in the same calculation unit in connection with the calculation unit of the collision risk degree. This is because it is necessary to compare them with the collision risk degree.

In summary, if the collision risk degree is low and the driver has the intent to depart from the lane, the vehicle warning control device delays the warning control time to prevent generation of unnecessary warnings. In contrast, when the collision risk degree is very high, the vehicle warning control device may advance the warning control time regardless of the driver's intent to prevent risk. If it is determined that the collision risk degree is present in a predetermined section, the preset reference warning time is applied to the warning logic as it is.

Through the operations, the warning control time may be dynamically changed, thereby simultaneously enhancing driver convenience and stability.

Hereinafter, an example of an operation of delaying or advancing a warning control time is described in detail with reference to the drawings. Operations described with reference to FIGS. 6 and 7 are exemplary and are not limited thereto.

Figure 6:
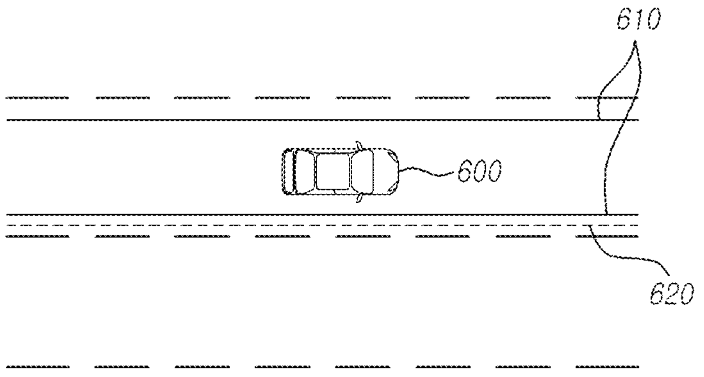
FIG. 6 is a view illustrating an operation when a warning control time is delayed, according to an embodiment.
Figure 7:
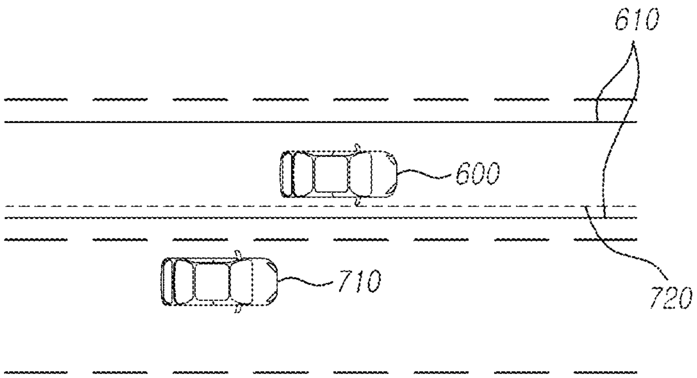
FIG. 7 is a view illustrating an operation when a warning control time is advanced, according to an embodiment.

FIG. 6 is a view illustrating an operation when a warning control time is delayed, according to an embodiment.

FIG. 6 illustrates that the vehicle 600 drives on two lanes. A reference warning time 610 is set for the vehicle 600, and a reference warning time 610 is set as a predetermined distance with respect to the lane.

For example, the reference warning time may be set as a predetermined ratio with respect to half of a value obtained by subtracting the width of the vehicle 600 from the width of the driving lane in which the vehicle 600 drives. Accordingly, when the vehicle 600 drives in the center of the lane, the distances to the left lane line and the right lane line may be the same. If the predetermined ratio is set to 50%, the reference warning time 610 is set as half the distance from the left or right end of the vehicle 600 to the lane line.

When the vehicle 600 approaches the lane line past the reference warning time 610, a warning for keeping in the lane or preventing the vehicle 600 from departing from the lane may be generated.

In this situation, when it is determined that the driver has the intent to depart from and the collision risk degree is less than the first threshold, the vehicle warning control device may set the warning control time 620 so that the reference warning time 610 is delayed.

For example, when the ratio set to 50% is set to 75%, the vehicle warning control device sets the warning control time 620 to be closer to the lane line. Accordingly, even if the vehicle 600 exceeds the reference warning time 610, if the vehicle 600 does not exceed the warning control time 620, the warning may not be generated. Here, the ratio may indicate a range in which the vehicle 600 is allowed to invade without warning in half of the value obtained by subtracting the vehicle width from the lane. In this case, the correction value may be set to 50%, and multiplied by the existing predetermined ratio of 50%, so that a warning control time of 75% may be determined.

When the reference warning time 610 is set with respect to the distance from the vehicle 600, the correction value is set to a value that increases the distance, and the warning control time 620 is set to at a longer distance from the vehicle 600. Similarly, when the reference warning time 610 is set with respect to the lane line, the correction value may be determined so that the warning control time 620 is set at a distance closer to the lane line.

For unnecessary consumption and quick calculation of computing power, the vehicle warning control device may set a warning control time 620 only for a direction in which the vehicle moves.

FIG. 7 is a view illustrating an operation when a warning control time is advanced, according to an embodiment.

FIG. 7 illustrates a case in which the control time 720 should appear earlier as opposed to FIG. 6. The vehicle 600 and the reference warning time 610 may appear as described with reference to FIG. 6.

However, when it is determined that the collision risk degree with the target vehicle 710 is larger than or equal to the second threshold, the vehicle warning control device needs to set the warning control time 720 to a value earlier than the reference warning time 610.

For example, the vehicle warning control device may set the correction value to 40% so that the above-described ratio value is changed from 50% to 20%. Alternatively, when set based on the distance, the reference warning time 610 may be corrected and applied so that the warning control time 720 appears closer to the vehicle 600.

Accordingly, when the collision risk degree is equal to or larger than the second threshold regardless of the driver's intent, the vehicle warning control device may perform control to generate a warning even when the vehicle moves slightly toward the lane line. In particular, when the target vehicle 710 drives close to the vehicle 600, stability may be secured by changing the warning control time.

Further, when the collision risk is calculated as a value between the first threshold and the second threshold, the vehicle warning control device may maintain the reference warning time 610 so that a warning appears at a preset warning time.

As described above, the vehicle warning control technology according to the disclosure may dynamically control a warning time using a surrounding environment and a driver movement pattern. Accordingly, it is possible to enhance the driver's ride comfort by maximally suppressing the generation of unnecessary warnings while increasing the stability of the vehicle.

Hereinafter, the operation of the vehicle warning control device described with reference to FIGS. 1 to 7 is described once again with reference to the drawings. The operations in the vehicle warning control method described below may be performed in a different order or in combination. Alternatively, in the vehicle warning control method, a specific operation may be separately performed. Further, the vehicle warning control method may add an operation for performing each of the above-described embodiments or omit some steps.

Figure 8:
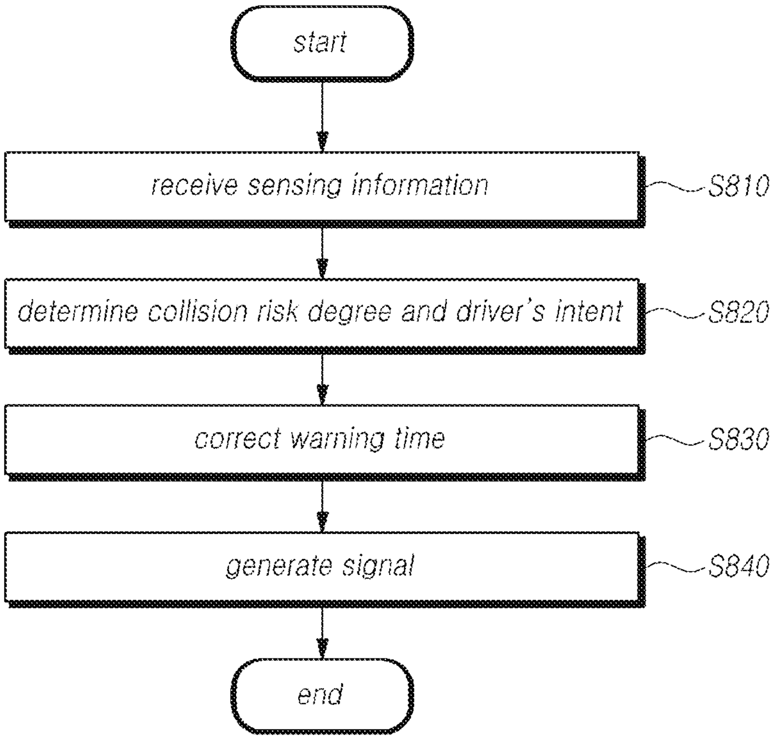
FIG. 8 is a view illustrating a vehicle warning control method according to an embodiment.

FIG. 8 is a view illustrating a vehicle warning control method according to an embodiment.

Referring to FIG. 8, the vehicle warning control method may include a reception step receiving sensing information through an in-vehicle sensor (S810).

For example, in the receiving step, sensing information may be received from various sensors configured inside and outside the vehicle. The sensing information may be received through wired or wireless communication technology. Further, the reception step may receive sensing information through a device such as a server outside the vehicle.

For example, information about the driving road information about the vehicle may be received as sensing information through a navigation device.

For example, the sensing information may include at least one of lane information, surrounding vehicle recognition information, steering wheel grip information, and steering torque information. If the lane information refers to information about the lane of the road on which the vehicle is driving, the lane information may be obtained through the camera or the navigation device. The surrounding vehicle recognition information may include information about a surrounding vehicle recognized based on surrounding environment information recognized through a radar, a LiDAR, a camera sensor, or the like of the vehicle. For example, the surrounding vehicle recognition information may include whether there is a surrounding vehicle, the speed of the surrounding vehicle, location information, type information about the surrounding vehicle, and the like. Here, the surrounding vehicle may include an object such as an obstacle.

The steering wheel grip information may include information about whether the driver is holding the steering wheel. The steering wheel grip information may be obtained through a sensor configured on the steering wheel. Alternatively, the steering wheel grip information may be obtained by a camera sensor configured inside the vehicle and having the inside of the vehicle as a sensing range. The steering torque information may be obtained by a steering torque sensor connected to the steering wheel. The steering torque information includes information about the torque generated when the driver manipulates the steering wheel. The steering torque information may include information about the steering angle. In this case, the steering torque information may be obtained by a torque angle sensor.

Further, the sensing information may further include driver gaze information. The driver gaze information may include information for tracking or identifying the gaze as to where the driver is looking in the vehicle. The driver gaze information may be obtained by a camera sensor configured in the vehicle to track the driver's gaze.

The vehicle warning control method may include a determination step for determining a collision risk degree of the vehicle and the driver's intent based on the sensing information (S820).

For example, the determination step calculates a collision risk degree by determining whether there is a risk that the vehicle collides with another vehicle. Further, the determination step determines the driver's intent by predicting whether the driver intends to change the lane.

For example, when it is determined that the driver grips the steering wheel based on the steering wheel grip information, the determination step may determine the driver's intent according to whether steering torque information within a predetermined range in the moving direction of the vehicle is generated.

For example, the determination step may determine whether the driver grips the steering wheel based on the steering wheel grip information. When it is determined that the driver grips the steering wheel, the determination step may determine whether the steering torque is generated in the moving direction of the vehicle using the steering torque information. When the driver grips the steering wheel and the steering torque is generated within the predetermined range in the vehicle moving direction, the determination step may determine that the driver is willing to deviate from the lane in the moving direction.

When the steering torque is out of the predetermined range, the determination step may determine that the steering torque is generated by a temporary impact or a mistake, and determine that the driver does not intend to do so. Additionally, if the steering torque outside the predetermined range lasts for a predetermined time or more, the determination step may determine that there is the driver's intent. This is because the steering torque temporarily falling out of the range may be due to an external force or a mistake, but the continuous steering torque may require a lane change in an urgent situation.

As another example, when it is determined that the driver grips the steering wheel based on the steering wheel grip information, the determination step may determine the driver's intent based on whether steering torque information within the predetermined range is generated in the moving direction of the vehicle and whether the gaze information about the driver moves to a designated position set in association with the moving direction of the vehicle.

For example, the determination step may determine that the driver has the intent to depart from the lane when the driver grips the steering wheel, steering torque information within the predetermined range is generated in the moving direction of the vehicle, and the gaze information about the driver moves to the designated position. In other words, the determination step may determine that the driver has the intent when all of the three conditions are met. Alternatively, the determination step may determine that the driver has the intent when two or more of the three conditions are met.

Here, the designated position may be set as a point where a side mirror of the vehicle is positioned. Since the side mirror position may be relative in the driver's gaze, the designated position may be dynamically set according to the height and position of the driver's gaze. Further, the gaze tracking information may be used to determine whether the gaze information about the driver has moved to the designated position. Further, it may be determined that the gaze has been moved to the designated position only when the driver moves the gaze to the designated position for a predetermined time or more.

In other words, when the driver grips the steering wheel and controls the movement of the vehicle by generating steering torque within the predetermined range, if the driver moves his gaze to the side mirror position positioned in the moving direction of the vehicle, it should be considered that the driver has the intent to move the vehicle in the corresponding direction and depart from the lane. Accordingly, the determination step determines whether the above-described conditions are met to determine whether the driver has the intent.

Meanwhile, the determination step may calculate a collision risk degree as well as whether the driver has the intent to do so.

For example, the determination step may determine the collision risk degree based on a preset logic for calculating the collision risk degree between the vehicle and the target vehicle based on the surrounding vehicle recognition information.

In order to efficiently use computing power, the determination step may select the target vehicle from among surrounding vehicles present in the moving direction of the vehicle. For example, the vehicle having the closest relative distance to the vehicle may be selected as the target vehicle. The determination step may calculate the collision risk degree according to whether there is a collision risk degree using the information about the vehicle and the target vehicle.

For example, the determination step may calculate a time to collision (TTC) between the vehicle and the target vehicle and determine that there is a risk of collision when the TTC is less than a threshold. Alternatively, the determination step may determine the collision risk degree by calculating a time gap between the vehicle and the target vehicle. Alternatively, the determination step may determine the collision risk degree of the vehicle using a responsibility-sensitive safety (RSS) model. As the preset collision risk degree determination logic, various known logics for collision risk degree determination may be used, and the determination logic is not limited thereto.

The determination step may arithmetically calculate the collision risk degree or may calculate the collision risk degree as a grade. This is determined according to a preset collision risk degree calculation method, and there is no limitation thereto.

The vehicle warning control method may include a warning time correction step for setting a warning control time by applying a correction value determined based on the result of determining the driver's intent and the collision risk degree.

For example, the warning time correction step may correct a reference warning time set in the vehicle using the driver's intent and the result of determining the risk of collision. To that end, the warning time correction step may determine the correction value and apply the correction value to the reference warning time to set a warning control time, which is the time at which a warning is actually generated. Therefore, the warning control time is dynamically changed according to the determination result.

For example, when it is determined that the collision risk degree is less than a predetermined first threshold and the driver has the intent to depart from the driving lane according to the result of determining the driver's intent, the warning time correction step may determine the correction value so that the warning control time is delayed more than the reference warning time. For example, if the risk of collision is evaluated to be low and the driver has the intent to do so, the warning time correction step may delay the warning control time to provide a time for the driver to operate the turn signal. Here, the first threshold may be preset, and the threshold may be set in the same unit according to the calculation unit (e.g., level, grade, score, etc.) of the collision risk degree.

As another example, when the collision risk degree is equal to or larger than a preset second threshold, the warning time correction step may determine the correction value so that the warning control time is earlier than the reference warning time. For example, when it is determined that the collision risk degree is high, the warning time correction step may advance the warning time so that the warning is generated quickly regardless of the driver's intent. To that end, the second threshold may also be set to be the same in unit as the first threshold. Meanwhile, the first threshold and the second threshold may be set to different values, and the second threshold may be set to a value larger than the first threshold (indicating that the risk is high).

As another example, when it is determined that the collision risk degree is larger than or equal to the first threshold and less than the second threshold or the collision risk degree is less than the first threshold but the driver does not intend to depart from the driving lane, the warning time correction step may determine that the correction value is 0 and determine that the warning control time is the reference warning time. For example, the warning time correction step may allow the warning to operate at the reference warning time without correcting the warning control time.

The above-described correction value may be set as a value for delaying or advancing the reference warning time, and the factor may be determined according to the factor for setting the reference warning time. For example, when the reference warning time is set based on the distance between the lane and the vehicle, the correction value may also be set to a value capable of changing the distance. For example, the correction value may be set as a percentage value, and the warning control time may be changed by proportionally changing the distance. As another example, the correction value may be set as a distance value and be added to the distance for the reference warning time, thereby changing the warning control time. Further, the correction value may be set in various ways, and may act as a factor on various logics to be used to dynamically set the warning control time.

For example, the warning control time may be set by applying the correction value with respect to half of the distance except for the vehicle width from the width of the driving lane in which the vehicle drives. In other words, the reference warning time may be determined so that a warning is generated when the vehicle approaches the lane by 50% or more of the half distance of a half of the distance obtained by subtracting the vehicle width from the road width. In this case, the correction value may be set to a value for changing the corresponding 50% to 90% or to 20%. Alternatively, the correction value may be set as a value for changing the distance itself. There is no limitation on the unit and application method of the correction value.

The vehicle warning control method may include a signal generation step that generates at least one of a warning signal and a vehicle movement control torque signal based on the warning control time (S840).

For example, the signal generation step may generate a warning signal so that a warning is generated by at least one of visual, auditory, and tactile senses. Alternatively, the signal generation step may generate a warning signal so that warnings for visual, auditory, and tactile senses are changed sequentially or adaptively in response to a response. For example, the signal generation step may control to primarily generate an auditory signal and, if the warning situation continues even after a predetermined time, may additionally generate a tactile signal or a visual signal.

Meanwhile, the signal generation step may generate a movement control torque signal to prevent the vehicle from departing from the lane. To that end, the assist torque may be calculated. When the lane keeping assistance function is turned on, the signal generation step may change the movement of the vehicle by calculating the assist torque to keep the vehicle in the lane.

Through the above-described operations, the vehicle warning control device may dynamically control a warning signal generated in the vehicle, thereby reducing unnecessary warnings and enhancing driver safety.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle warning control device, comprising:

a receiver receiving sensing information through an in-vehicle sensor;

a processor configured to determine a collision risk degree of the vehicle and a driver's intent based on the sensing information;

a warning timing adjustment processor configured to determine a warning control time by applying a correction value determined based on a result of determining the collision risk degree and the driver's intent; and a signal generation processor configured to generate at least one of a warning signal and a vehicle movement control torque signal based on the warning control time, wherein the correction value is determined such that (i) when the collision risk degree is less than a preset first threshold and the driver intends to depart from a driving lane, the warning control time is delayed relative to a reference warning time; (ii) when the collision risk degree is greater than or equal to a preset second threshold, the warning control time is advanced relative to the reference warning time; and (iii) when the collision risk degree is between the first and second thresholds or when the collision risk degree is less than the first threshold and the driver does not intend to depart from the driving lane, the warning control time is equal to the reference warning time, the second threshold being greater than the first threshold.

2. The vehicle warning control device of claim 1, wherein the sensing information includes lane information, surrounding vehicle recognition information, steering wheel grip information, and steering torque information.

3. The vehicle warning control device of claim 2, wherein the processor configured to determine the driver's intent according to whether the steering torque information within a predetermined range is generated in a moving direction of the vehicle if it is determined that the driver grips a steering wheel based on the steering wheel grip information.

4. The vehicle warning control device of claim 2, wherein the sensing information further includes driver gaze information, and wherein the processor configured to determine the driver's intent based on whether the steering torque information within a predetermined range is generated in a moving direction of the vehicle and whether the driver gaze information moves to a designated position set in association with the moving direction of the vehicle, if it is determined that the driver grips the steering wheel based on the steering wheel grip information.

5. The vehicle warning control device of claim 4, wherein the designated position is a point where a side mirror of the vehicle is positioned, and is dynamically set according to a height of the driver's gaze.

6. The vehicle warning control device of claim 2, wherein the processor configured to determine the collision risk degree according to a logic for calculating the collision risk degree between the vehicle and a target vehicle based on the surrounding vehicle recognition information.

7. The vehicle warning control device of claim 1, wherein when it is determined that the collision risk degree is larger than or equal to the first threshold and less than the second threshold, or when it is determined that the collision risk degree is less than the first threshold but the driver has no intent to depart from the driving lane, the warning timing adjustment processor configured to determine that the correction value is 0 and determines that the warning control time is the reference warning time.

8. The vehicle warning control device of claim 1, wherein the warning control time is set by applying the correction value with respect to half of a distance obtained by excluding a width of the vehicle from a width of a driving lane in which the vehicle drives.

9. The vehicle warning control device of claim 1, wherein the processor is further configured to determine the driver's intent to depart from the driving lane based on steering wheel grip information and steering torque information, and to determine that the driver intends to depart from the driving lane when steering torque within a predetermined range in a vehicle moving direction is generated while the steering wheel is gripped by the driver.

10. The vehicle warning control device of claim 1, wherein the processor is further configured to determine the collision risk degree by calculating a time-to-collision (TTC) between the vehicle and a target vehicle detected using surrounding vehicle recognition information, and determining the collision risk degree based on whether the calculated TTC is less than a preset threshold.

11. A vehicle warning control method, comprising:

receiving sensing information through an in-vehicle sensor;

determining a collision risk degree of the vehicle and a driver's intent based on the sensing information;

setting a warning control time by applying a correction value determined based on a result of determining the collision risk degree and the driver's intent; and generating at least one of a warning signal and a vehicle movement control torque signal based on the warning control time, wherein the correction value is determined such that (i) when the collision risk degree is less than a preset first threshold and the driver intends to depart from a driving lane, the warning control time is delayed relative to a reference warning time; (ii) when the collision risk degree is greater than or equal to a preset second threshold, the warning control time is advanced relative to the reference warning time; and (iii) when the collision risk degree is between the first and second thresholds or when the collision risk degree is less than the first threshold and the driver does not intend to depart from the driving lane, the warning control time is equal to the reference warning time, the second threshold being greater than the first threshold.

12. The vehicle warning control method of claim 11, wherein the sensing information includes lane information, surrounding vehicle recognition information, steering wheel grip information, and steering torque information.

13. The vehicle warning control method of claim 12, wherein the determining a collision risk degree of the vehicle and a driver's intent determines the driver's intent according to whether the steering torque information within a predetermined range is generated in a moving direction of the vehicle if it is determined that the driver grips a steering wheel based on the steering wheel grip information.

14. The vehicle warning control method of claim 12, wherein the sensing information further includes driver gaze information, and wherein the determining a collision risk degree of the vehicle and a driver's intent determines the driver's intent based on whether the steering torque information within a predetermined range is generated in a moving direction of the vehicle and whether the driver gaze information moves to a designated position set in association with the moving direction of the vehicle, if it is determined that the driver grips the steering wheel based on the steering wheel grip information.

15. The vehicle warning control method of claim 14, wherein the designated position is a point where a side mirror of the vehicle is positioned, and is dynamically set according to a height of the driver's gaze.

16. The vehicle warning control method of claim 12, wherein the determining a collision risk degree of the vehicle and a driver's intent determines the collision risk degree according to a logic for calculating the collision risk degree between the vehicle and a target vehicle based on the surrounding vehicle recognition information.

17. The vehicle warning control method of claim 11, wherein if it is determined that the collision risk degree is less than a predetermined first threshold and that the driver has an intent to depart from a driving lane according to a result of determining the driver's intent, the setting a warning control time determines the correction value so that the warning control time is delayed as compared with a reference warning time.

18. The vehicle warning control method of claim 17, wherein the setting a warning control time determines the correction value so that the warning control time is earlier than the reference warning time when the collision risk degree is larger than or equal to a preset second threshold.

19. The vehicle warning control method of claim 18, wherein when it is determined that the collision risk degree is larger than or equal to the first threshold and less than the second threshold, or when it is determined that the collision risk degree is less than the first threshold but the driver has no intent to depart from the driving lane, the setting a warning control time determines that the correction value is 0 and determines that the warning control time is the reference warning time.

20. The vehicle warning control method of claim 11, wherein the warning control time is set by applying the correction value with respect to half of a distance obtained by excluding a width of the vehicle from a width of a driving lane in which the vehicle drives.

* * * * *